United States Patent [19]

Garner

[11] 4,075,138

[45] Feb. 21, 1978

[54] POLYMERIZATION PROCESS AND VINYLIDENE CHLORIDE MICROSPHERES PRODUCED THEREBY

[75] Inventor: Joseph L. Garner, Sanford, Mich.

[73] Assignee: The Dow Chemical Company, Midland, Mich.

[21] Appl. No.: 793,332

[22] Filed: May 3, 1977

Related U.S. Application Data

[63] Continuation-in-part of Ser. No. 649,884, Jan. 16, 1976, abandoned, which is a continuation of Ser. No. 270,296, July 10, 1972, abandoned.

[51] Int. Cl.² ............................ C08J 9/16; C08J 9/18
[52] U.S. Cl. ................................. 260/2.5 B; 526/336
[58] Field of Search ....................................... 260/2.5 B

[56] References Cited

U.S. PATENT DOCUMENTS 3,615,972  10/1971  Morehouse, Jr. et al. ....... 260/2.5 B

*Primary Examiner*—Morton Foelak
*Attorney, Agent, or Firm*—R. B. Ingraham

[57] ABSTRACT

Vinylidene chloride microspheres are polymerized in relatively large vessels with a relatively reduced peak exotherm employing a small quantity of a comonomer such as methacrylonitrile, methylmethacrylate, sytrene or butadiene which has a higher copolymerization reactivity with respect to acrylonitrile and a lower propagation rate constant.

6 Claims, No Drawings

POLYMERIZATION PROCESS AND VINYLIDENE CHLORIDE MICROSPHERES PRODUCED THEREBY

This is a continuation-in-part of application Ser. No. 649,884, filed Jan. 16, 1976, now abandoned, which in turn is a Continuation of Application Ser. No. 270,296, filed July 10, 1972, now abandoned.

Vinylidene chloride-containing microspheres are well known in the art, and as desirable articles of commerce, particularly the expandable vinylidene chloride microspheres such as expandable vinylidene chloride microspheres containing from about 60 to 90 parts by weight vinylidene chloride in the polymer shell polymerized with from about 40 to 10 parts by weight of another monomer or monomers copolymerized therewith, such as acrylonitrile. Expandable microspheres of such compositions generally range in diameter from about 1 to 50 microns and beneficially from about 2 to 20 microns and have symmetrically encapsulated therein a volatile liquid expanding agent such as butane, pentane, isopentane and the like. The vinylidene chloride-containing expandable microspheres are particularly desirable for many applications wherein solvent resistance and low expansion temperatures are desirable such as for the incorporation in paper as a bulking agent and in polyester resins. The preparation of such expandable microspheres including vinylidene chloride polymer-containing microspheres is set forth at great length in U.S. Pat. No. 3,615,972. Substantial difficulty has been encountered in the preparation of relatively large quantities of expandable microspheres employing vinylidene chloride as a major monomeric component and acrylonitrile as a minor component in that the rate of reaction is such that during at least one period during the reaction the amount of heat or peak exotherm that is required to be removed from the reaction mixture is greater than the amount that can be conveniently removed by means of most conventional agitated jacketed batch reaction vessels. Thus, the vinylidene chloride polymer expandable microspheres can readily be prepared in small quantities. However, equipment limitations with regard to heat transfer prevent a convenient scaling up or increasing of the batch size. Generally it is desirable in order to obtain expandable microspheres of a desirable quantity that polymerization take place at a temperature very close to a predetermined desired temperature. If the heat of reaction is not removed from the reaction mixture the temperature can increase to an undesired level, causing a more rapid polymerization and evolution of heat. Temperatures and pressures may rise sufficiently high that pressure relief means, such as frangible safety discs, rupture and the contents of the vessel are discharged before a product useful for the intended purpose is obtained.

It would be desirable if there were available an improved method for the preparation of vinylidene chloride expandable microspheres.

It would also be desirable if there were available an improved method for the preparation of vinylidene chloride microspheres which would permit a reduced peak exotherm during polymerization.

It would further be desirable if there were available an improved method for the preparation of vinylidene chloride polymer expandable microspheres to permit expansion of the microspheres to lower density particles.

These benefits and other advantages in accordance with the present invention are achieved in a method for the preparation of synthetic resinous thermoplastic microspheres employing from 60 to 90 parts by weight of vinylidene chloride and from 40 to 10 parts by weight of acrylonitrile, the steps of the method comprising preparing an oil phase containing the polymerizable component and a liquid blowing agent which volatilizes at a temperature below the heat softening point of the polymer prepared from the monomer mixture, dispersing the oil phase in the water phase, the water phase containing a dispersion stabilizer, the oil phase being dispersed as a plurality of droplets having diameters from about 1 to about 50 microns, initiating polymerization of the monomer in the droplets to form a plurality of hollow polymer particles having symmetrically encapsulated therein a volatile fluid foaming agent, the improvement which comprises employing from about 3 to 12 parts by weight of a copolymerizable monomer having a propagation constant of from about 2 to about 15,000 liters per mole second and $(r_1/r_2) > 1$ wherein $r_1$ is the reactivity ratio for the copolymerizable monomer and $r_2$ is the reactivity ratio for acrylonitrile; the copolymerizable monomer being selected from the group consisting of methacrylonitrile, methylmethacrylate, styrene, 1,3-butadiene and mixtures thereof. The definition of $r_1/r_2$ is described in POLYMER HANDBOOK by Brandrup and Immergut, II-141, Third Edition, 1967, Interscience Publishers, with the further limitation that the vinylidene chloride/acrylonitrile/volatile fluid foaming agent and the copolymerizable monomer are mutually soluble at a temperature between about 20° to 90° C.

Also contemplated within the scope of the present invention is an improved synthetic resinous thermoplastic microsphere having polymerized in the polymer shell from about 60 to 90 parts by weight vinylidene chloride, from about 40 to 10 parts by weight acrylonitrile and from about 3 to 12 parts by weight of a copolymerizable monomer having a propagation constant of from about 2 to about 15,000 liters per mole second and $(r_1/r_2) > 1$ wherein $r_1$ is the reactivity ratio for the copolymerizable monomer and $r_2$ is the reactivity ratio for acrylonitrile, the copolymerizable monomer being selected from the group consisting of methacrylonitrile, methylmethacrylate, styrene, 1,3-butadiene and mixtures thereof (the definition of $r_1/r_2$ is described in POLYMER HANDBOOK by Brandrup and Immergut, II-141, Third Edition, 1967, Interscience Publishers), with the further limitation that the vinylidene chloride/acrylonitrile/volatile fluid foaming agent and the copolymerizable monomer are mutually soluble at a temperature between about 20° to 90° C, having generally symmetrically encapsulated therein a volatile liquid blowing agent which volatilizes at a temperature below the heat softening point of the polymer, the blowing agent being a distinct and separate liquid phase.

In the practice of the present invention, the polymerizable monomers, blowing agents and optionally a suitable free radical initiator are incorporated into an oil phase, a water phase is prepared employing suitable suspending agents. The process is described at great length in U.S. Pat. No. 3,615,972, herewith incorporated by reference. The water and oil phases are mixed employing violent agitation sufficient to disperse the oil phase in the water phase and to form droplets having diameters from about 1 to 50 microns. The resulting reaction mixture is then polymerized in a generally oxygen-free reaction vessel at temperatures from about 20° to 90° C, and beneficially at temperatures from about 40° to 65° C. The vinylidene chloride and acrylonitrile of commercial purity are eminently satisfactory. The third monomeric component beneficially has one or more of methacrylonitrile, methylmethacrylate, styrene, 1,3-butadiene and mixtures thereof.

A wide variety of the fluid foaming agents are readily employed in the practice of the present invention. Advantageously such fluid foaming agents are soluble in the monomeric mixture and generally insoluble in the resultant polymer. Suitable fluid foaming agents are set forth in the hereinbefore referred to patent. Particularly advantageous blowing agents include butane, isobutane, neopentane and mixtures thereof. Generally such blowing agents are incorporated in the microspheres in a proportion of from about 10 to 30 weight percent, based on the total weight of the microspheres.

By way of further illustration, a plurality of polymerization runs are carried out each employing the following basic recipe: for the oil phase — 560 parts by weight vinylidene chloride; 200 parts by weight acrylonitrile; 5.5 parts by weight divinylbenzene (as a 55 percent solution in diethylbenzene); 89 parts by weight isobutane; 4 parts by weight sec-butyl peroxydicarbonate; for the water phase — 1322 parts by weight of deionized water; 110 parts by weight of a 30 percent aqueous dispersion of colloidal silica commercially available under the trade designation of Ludox HS; 0.4 part by weight of potassium dichromate; 5.5 parts by weight of a 60 weight percent aqueous solution of a copolymer prepared from diethanolamine and adipic acid in equimolar proportions by carrying out a condensation reaction to give a product having a viscosity of about 100 centipoise at 25° C when the viscosity of a 10 weight percent solution in water is measured; 25 parts by weight sodium chloride and sufficient aqueous hydrochloric acid to provide a pH of 4. The oil phase and the water phase are then mixed employing high speed violent agitation with an impeller blade rotating about 10,000 revolutions per minute. The reaction mixture is then transferred to an agitated, nitrogen-purged, jacketed reaction vessel instrumented to permit the determination of the polymerization exotherm. A plurality of polymerizations are carried out adding the indicated quantities of additional monomer. The reactor is heated to 50° C and maintained at that temperature for about 20 hours. When the foregoing recipe containing only vinylidene chloride and acrylonitrile as monomer is polymerized, a maximum exotherm in excess of 1030 calories per minute is obtained. When 19 parts by weight methacrylonitrile are added, the maximum exotherm is 710 calories per minute, and when 38 parts by weight methacrylonitrile are added, the maximum exotherm is 420 calories per minute; with 38 parts by weight methylmethacrylate, the maximum exotherm is 360 calories per minute. The reaction time of the polymerization does not appear to significantly increase, but the maximum heat evolved per unit time or peak exotherm is significantly more uniform permitting polymerization in large vessels which need not be designed for a high heat transfer characteristic in order to retain the reaction mixture at the desired temperature.

Similar beneficial and advantageous results are obtained when the methacrylonitrile of the foregoing illustration is replaced with styrene, 1,3-butadiene and mixtures thereof.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. In a method for the preparation of synthetic resinous thermoplastic microspheres employing from 60 to 90 parts by weight of vinylidene chloride and from 40 to 10 parts by weight of acrylonitrile, the steps of the method comprising preparing an oil phase containing the polymerizable component and a liquid blowing agent which volatilizes at a temperature below the heat softening point of the polymer prepared from the monomer mixture, dispersing the oil phase in the water phase, the water phase containing a dispersion stabilizer, the oil phase being dispersed as a plurality of droplets having diameters from about 1 to about 50 microns, initiating polymerization of the monomer in the droplets to form a plurality of hollow polymer particles having symmetrically encapsulated therein a volatile fluid foaming agent, the improvement which comprises employing from about 3 to 12 parts by weight of a copolymerizable monomer having a propagation constant of from about 2 to about 15,000 liters per mole second and $(r_1/r_2) > 1$ wherein $r_1$ is the reactivity ratio for the copolymerizable monomer and $r_2$ is the reactivity ratio for acrylonitrile, with the further limitation that the vinylidene chloride/acrylonitrile/volatile fluid foaming agent and the copolymerizable monomer are mutually soluble at a temperature between about 20° to 90° C and the copolymerizable monomer being selected from the group consisting of methacrylonitrile, methylmethacrylate, styrene, 1,3-butadiene and mixtures thereof.

2. The method of claim 1 wherein the copolymerizable monomer is methacrylonitrile.

3. An improved synthetic resinous thermoplastic microsphere having polymerized in the polymer shell from about 60 to 90 parts by weight of vinylidene chloride, from about 40 to 10 parts by weight of acrylonitrile and from about 3 to 12 parts by weight of a copolymerizable monomer having a propagation constant of from about 2 to about 15,000 liters per mole second and $(r_1/r_2) > 1$ wherein $r_1$ is the reactivity ratio for the copolymerizable monomer and $r_2$ is the reactivity ratio for acrylonitrile, the copolymerizable monomer being selected from the group consisting of methacrylonitrile, methylmethacrylate, styrene, 1,3-butadiene and mixtures thereof with the further limitation that the vinylidene chloride/acrylonitrile/volatile fluid foaming agent and the copolymerizable monomer are mutually soluble at a temperature between about 20° to 90° C, having generally symmetrically encapsulated therein a volatile liquid blowing agent which volatilizes at a temperature below the heat softening point of the polymer, the blowing agent being a distinct and separate liquid phase.

4. The microsphere of claim 3 wherein the copolymerizable monomer is methacrylonitrile.

5. In a method for the preparation of synthetic resinous thermoplastic microspheres employing from 60 to 90 parts by weight of vinylidene chloride and from 40 to 10 parts by weight of acrylonitrile, the steps of the method comprising
preparing an oil phase containing the polymerizable component and a liquid blowing agent which volatilizes at a temperature below the heat softening point of the polymer prepared from the monomer mixture,
dispersing the oil phase in the water phase, the water phase containing a dispersion stabilizer, the oil phase being dispersed as a plurality of droplets having diameters from about 1 to about 50 microns,
initiating polymerization of the monomer in the droplets to form a plurality of hollow polymer particles having symmetrically encapsulated therein a volatile fluid foaming agent, the improvement which comprises.
employing as the copolymerizable monomer from about 3 to 12 parts by weight of methacrylonitrile, methylmethacrylate, styrene, 1,3-butadiene and mixtures thereof, with the further limitation that the vinylidene chloride/acrylonitrile/volatile fluid foaming agent and the copolymerizable monomer are mutually soluble at a temperature between about 20° to 90° C.

6. An improved synthetic resinous thermoplastic microsphere having polymerized in the polymer shell from about 60 to 90 parts by weight vinylidene chloride, from about 40 to 10 parts by weight acrylonitrile and from about 3 to 12 parts by weight of a monomer selected from the group consisting of methacrylonitrile, methylmethacrylate, styrene, 1,3-butadiene and mixtures thereof, with the further limitation that the vinylidene chloride/acrylonitrile/volatile fluid foaming agent and the copolymerizable monomer are mutually soluble at a temperature between about 20° to 90° C, having generally symmetrically encapsulated therein a volatile liquid blowing agent which volatilizes at a temperature below the heat softening point of the polymer, the blowing agent being a distinct and separate liquid phase.

* * * * *